United States Patent
Lee

(10) Patent No.: US 10,086,786 B2
(45) Date of Patent: Oct. 2, 2018

(54) VEHICLE WITH AUTOMATIC CONNECTION OF EMERGENCY CALL AND CONTROL METHOD FOR THE SAME

(71) Applicant: Hyundai Motor Company, Seoul (KR)

(72) Inventor: Yunjae Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 115 days.

(21) Appl. No.: 15/058,373

(22) Filed: Mar. 2, 2016

(65) Prior Publication Data

US 2017/0136973 A1 May 18, 2017

(30) Foreign Application Priority Data

Nov. 13, 2015 (KR) ........................ 10-2015-0159893

(51) Int. Cl.
| | | |
|---|---|---|
| *B60R 21/0132* | (2006.01) | |
| *B60R 21/015* | (2006.01) | |
| *B60R 21/0136* | (2006.01) | |
| *G08B 25/01* | (2006.01) | |
| *G08B 25/08* | (2006.01) | |

(Continued)

(52) U.S. Cl.
CPC ...... *B60R 21/0132* (2013.01); *B60R 21/0136* (2013.01); *B60R 21/01512* (2014.10); *G08B 25/016* (2013.01); *G08B 25/08* (2013.01); *B60R 2021/0027* (2013.01); *B60R 2021/01013* (2013.01); *B60R 2021/01286* (2013.01)

(58) Field of Classification Search
CPC .......... B60R 21/0132; B60R 21/01512; B60R 21/0136; B60R 2021/0027; B60R 2021/01013; B60R 2021/01286; G08B 25/016

See application file for complete search history.

(56) References Cited

U.S. PATENT DOCUMENTS

| | | | |
|---|---|---|---|
| 5,572,204 A | * | 11/1996 | Timm ...................... G08G 1/20 340/988 |
| 6,617,979 B2 | * | 9/2003 | Yoshioka ................ B60R 21/01 340/436 |

(Continued)

FOREIGN PATENT DOCUMENTS

| | | | | |
|---|---|---|---|---|
| DE | 102005018234 B3 | * | 11/2006 | ........... G08B 25/001 |
| JP | H1169456 A | | 3/1999 | |

(Continued)

OTHER PUBLICATIONS

M. Skutek et al., "A Precrash System Based on Radar for Automotive Applications," Year: 2003, pp. 37-41.*

(Continued)

*Primary Examiner* — Tuan C To
(74) *Attorney, Agent, or Firm* — Mintz Levin Cohn Ferris Glovsky and Popeo, P.C.; Peter F. Corless

(57) ABSTRACT

A vehicle is capable of providing an immediate notification that an emergency has occurred by transmitting a trigger signal to an emergency call unit even when only a few of a plurality of airbag deployment conditions are satisfied. The vehicle is further capable of improving reliability of the emergency call by performing an additional check to confirm via voice recognition whether an emergency has actually occurred when a few of the plurality of airbag deployment conditions are satisfied.

8 Claims, 17 Drawing Sheets

(51) Int. Cl.
*B60R 21/00* (2006.01)
*B60R 21/01* (2006.01)

(56) References Cited

U.S. PATENT DOCUMENTS

| | | | | |
|---|---|---|---|---|
| 6,748,211 B1* | 6/2004 | Isaac | ............ | H04W 4/14 |
| | | | | 455/414.1 |
| 8,454,052 B1* | 6/2013 | Rose | ............ | B60R 21/276 |
| | | | | 280/736 |
| 9,161,195 B1* | 10/2015 | Nix | ............ | H04W 4/90 |
| 9,661,664 B2* | 5/2017 | Nix | ............ | H04W 4/90 |
| 9,729,638 B2* | 8/2017 | Kulnick | ............ | G08G 1/205 |
| 9,802,565 B2* | 10/2017 | Nilsson | ............ | B60R 21/0134 |
| 2002/0115423 A1* | 8/2002 | Hatae | ............ | G08B 13/19645 |
| | | | | 455/404.1 |
| 2004/0198466 A1* | 10/2004 | Walby | ............ | G06F 1/3209 |
| | | | | 455/574 |
| 2006/0017612 A1* | 1/2006 | Nagatani | ............ | G01S 5/0027 |
| | | | | 342/357.64 |
| 2010/0324774 A1* | 12/2010 | Bouni | ............ | B60R 21/0152 |
| | | | | 701/31.4 |
| 2011/0282526 A1* | 11/2011 | Mirle | ............ | B60L 1/12 |
| | | | | 701/22 |
| 2013/0194087 A1* | 8/2013 | Tomer | ............ | G08G 1/205 |
| | | | | 340/436 |
| 2014/0031005 A1* | 1/2014 | Sumcad | ............ | H04W 4/046 |
| | | | | 455/405 |
| 2015/0116133 A1* | 4/2015 | Mawbey | ............ | G08G 1/092 |
| | | | | 340/902 |
| 2015/0375703 A1* | 12/2015 | Modi | ............ | B60R 21/017 |
| | | | | 307/10.1 |
| 2015/0379362 A1* | 12/2015 | Calmes | ............ | G06K 9/2036 |
| | | | | 348/136 |
| 2016/0029197 A1* | 1/2016 | Gellens | ............ | G05D 1/0011 |
| | | | | 455/404.1 |
| 2016/0082912 A1* | 3/2016 | Yoon | ............ | B60R 21/01 |
| | | | | 701/45 |

FOREIGN PATENT DOCUMENTS

| | | | |
|---|---|---|---|
| JP | 2003-091791 A | | 3/2003 |
| JP | 2003281652 A | | 10/2003 |
| JP | 2004164078 A | | 6/2004 |
| JP | 2005-044060 A | | 2/2005 |
| JP | 2007183865 A | | 7/2007 |
| JP | 2014174741 A | * | 9/2014 ............ G08G 1/205 |
| KR | 10-2001-0005370 A | | 1/2001 |

OTHER PUBLICATIONS

Kwanghyun et al., "Design of an Airbag Deployment Algorithm Based on Precrash Information," Year: 2011, vol. 60, pp. 1438-1452.*

* cited by examiner

VEHICLE WITH AUTOMATIC CONNECTION OF EMERGENCY CALL AND CONTROL METHOD FOR THE SAME

CROSS-REFERENCE TO RELATED APPLICATION

This application claims under 35 U.S.C. § 119(a) the benefit of Korean Patent Application No. 10-2015-0159893, filed on Nov. 13, 2015 in the Korean Intellectual Property Office, the entire contents of which are incorporated herein by reference.

BACKGROUND

1. Field of the Invention

The present invention relates to a vehicle that is capable of automatically connecting an emergency call when an emergency has occurred in the vehicle and a control method for the same.

2. Description of the Related Art

An airbag is mounted in a vehicle to prevent a collision between an occupant and a structure in the vehicle and mitigate a transmission of an impact on the vehicle to the occupant when an accident occurs.

An airbag deployment condition is determined based on an output value of an impact sensor in an airbag control unit (ACU) to determine whether to deploy an airbag, and the deployment signal is transmitted to an airbag module when the airbag deployment condition is satisfied.

In addition, since an emergency call module may be mounted on a vehicle in conjunction with a telematics service, an emergency call unit makes an emergency call to a public safety answering position (PSAP) when an airbag deployment signal is generated.

Although an airbag may protect an occupant when an accident occurs, the airbag may instead cause an injury to the occupant when the airbag is deployed in situations in which deployment of the airbags is not required such as when an accident has not occurred or a minor collision accident has occurred.

Consequently, since the ACU strictly determines the airbag deployment condition, the ACU generates the airbag deployment signal only when all of a plurality of airbag deployment conditions are satisfied.

However, when the same conditions are applied also to the emergency call unit, a function of the emergency call unit provided for promptly taking required steps when an emergency occurs cannot be properly performed.

SUMMARY

Therefore, it is an aspect of the present invention to provide a vehicle capable of providing an immediate notification that an emergency has occurred in the vehicle by transmitting a trigger signal to an emergency call unit even when only a few of a plurality of airbag deployment conditions are satisfied and a control method for the same.

In addition, it is an aspect of the present invention to provide a vehicle capable of improving reliability of an emergency call by performing an additional check via voice recognition whether an emergency has actually occurred when a few of the plurality of airbag deployment conditions are satisfied and a control method for the same.

According to an embodiment, a vehicle includes a detection unit to detect a collision of the vehicle, an emergency call module to transmit an emergency call when a trigger signal is input, an airbag module including at least one airbag and to supply a gas to the at least one airbag when the trigger signal is input, an airbag controller to determine a plurality of airbag deployment conditions based on an output of the detection unit and transmit the trigger signal to the airbag module when all of the plurality of airbag deployment conditions are satisfied, and an emergency call controller to determine the plurality of airbag deployment conditions based on the output of the detection unit and transmit the trigger signal to the emergency call unit when at least one of the plurality of airbag deployment conditions is satisfied.

The vehicle may further include a voice recognition module to recognize a user's voice.

The emergency call controller may activate the voice recognition module when at least one of the plurality of airbag deployment conditions is satisfied.

The emergency call controller may transmit the trigger signal to the emergency call unit when a preset rescue request signal is included in a voice recognized by the voice recognition module.

The emergency call controller may determine whether the preset rescue request signal is included in the voice recognized by the voice recognition module.

The voice recognition module may determine whether the preset rescue request signal is included in the recognized voice and transmit the determined result to the emergency call controller.

The airbag controller may transmit the trigger signal to the emergency call unit when all of the plurality of airbag deployment conditions are satisfied.

The emergency call controller may determine whether the emergency call unit has already transmitted an emergency call before transmitting the trigger signal and transmit the trigger signal when the emergency call unit has not transmitted the emergency call.

The emergency call controller may be included in a head unit of the vehicle, and the airbag controller may be included in the ACU of the vehicle.

The emergency call controller and the airbag controller may be included in the ACU.

According to another embodiment, a vehicle includes a detection unit to detect a collision of the vehicle, an emergency call unit to transmit an emergency call when a trigger signal is input, an airbag module including at least one airbag and to supply a gas to the at least one airbag when the trigger signal is input, and an airbag control unit to determine a plurality of airbag deployment conditions based on an output of the detection unit, transmit the trigger signal to the emergency call unit when at least one of the plurality of airbag deployment conditions is satisfied, and transmit the trigger signal to the airbag module and the emergency call unit when all of the plurality of airbag deployment conditions are satisfied.

The vehicle may further include a voice recognition module to recognize a user's voice, and the airbag control unit may activate the voice recognition module when at least one of the plurality of airbag deployment conditions is satisfied.

The airbag control unit may transmit the trigger signal to the emergency call unit when a preset rescue request signal is included in the voice recognized by the voice recognition module.

According to still another embodiment, a vehicle includes a detection unit to detect a collision of the vehicle, an emergency call unit to transmit an emergency call when a trigger signal is input, an airbag module including at least one airbag and to supply a gas to the at least one airbag when the trigger signal is input, an airbag controller to determine n airbag deployment conditions (n is an integer which is equal to or greater than 2) based on an output of the detection unit and transmit the trigger signal to the airbag module when all of the n airbag deployment conditions are satisfied, and an emergency call controller to determine the n airbag deployment conditions based on the output of the detection unit and transmit the trigger signal to the emergency call unit when at least m airbag deployment conditions among the n airbag deployment conditions (m is an integer equal to or greater than 1 and less than n) are satisfied.

According to yet another embodiment, a vehicle includes a detection unit to detect a collision of the vehicle, an emergency call module to transmit an emergency call when a trigger signal is input, an airbag module including at least one airbag and to supply a gas to the at least one airbag when the trigger signal is input, an airbag controller to determine an airbag deployment condition based on an output of the detection unit and transmit the trigger signal to the airbag module when the airbag deployment condition is satisfied, and an emergency call controller to determine the airbag deployment condition based on the output of the detection unit and transmit the trigger signal to the emergency call unit when the airbag deployment condition is satisfied, wherein the airbag deployment condition is determined by applying a different standard from the airbag controller.

The airbag controller may determine that the airbag deployment condition is satisfied when a result calculated based on the output of the detection unit is equal to or greater than a first reference value, and the emergency call controller may determine that the airbag deployment condition is satisfied when the result calculated based on the output of the detection unit is equal to or greater than a second reference value, which is lower than the first reference value.

The airbag controller may determine that the airbag deployment condition is satisfied when the result calculated based on the output of the detection unit is equal to or less than the first reference value, and the emergency call controller may determine that the airbag deployment condition is satisfied when the result calculated based on the output of the detection unit is equal to or less than the second reference value, which is higher than the first reference value.

According to an embodiment, a control method for a vehicle includes detecting a collision of the vehicle using at least one sensor, determining a plurality of airbag deployment conditions based on an output of the at least one sensor, transmitting a trigger signal to an airbag module when all of the plurality of airbag deployment conditions are satisfied, and transmitting the trigger signal to an emergency call unit when at least one of the plurality of airbag deployment conditions is satisfied.

The control method for the vehicle may further include recognizing a user's voice when at least one of the plurality of airbag deployment conditions is satisfied.

The transmitting the trigger signal to the emergency call unit may include transmitting the trigger signal to the emergency call unit when a preset rescue request signal is included in the recognized voice.

The transmitting the trigger signal to the emergency call unit may further include transmitting the trigger signal to the emergency call unit when all of the plurality of airbag deployment conditions are satisfied.

The transmitting the trigger signal to the emergency call unit when at least one of the plurality of airbag deployment conditions is satisfied may include determining whether the emergency call unit has already transmitted an emergency call, and transmitting the trigger signal when the emergency call unit has not already transmitted the emergency call.

According to another embodiment, a control method for a vehicle includes detecting a collision of the vehicle using at least one sensor, determining n airbag deployment conditions (n is an integer equal to or greater than 2) based on an output of the at least one sensor, transmitting a trigger signal to an airbag module when all of the n airbag deployment conditions are satisfied, and transmitting the trigger signal to an emergency call unit when at least m airbag deployment conditions among the n airbag deployment conditions (m is an integer equal to or greater than 1 and less than n) are satisfied.

According to still another embodiment, a control method for a vehicle includes determining whether an airbag deployment condition is satisfied by applying a first reference value, transmitting a trigger signal to an airbag module when the airbag deployment condition is satisfied, determining whether the airbag deployment condition is satisfied by applying a second reference value which is different from the first reference value, and transmitting the trigger signal to the emergency call unit when the airbag deployment condition is satisfied.

The determining whether the airbag deployment condition is satisfied by applying the first reference value may include determining that the airbag deployment condition is satisfied when a result calculated based on an output of at least one sensor to detect a collision of the vehicle is equal to or greater than the first reference value.

The determining whether the airbag deployment condition is satisfied by applying the second reference value may include determining that the airbag deployment condition is satisfied when the result calculated based on the output of the at least one sensor is equal to or greater than the second reference value, which is lower than the first reference value.

The determining whether the airbag deployment condition is satisfied by applying the first reference value may include determining that the airbag deployment condition is satisfied when the result calculated based on the output of the at least one sensor to detect a collision of the vehicle is equal to or less than the first reference value.

The determining whether the airbag deployment condition is satisfied by applying the second reference value may include determining that the airbag deployment condition is satisfied when the result calculated based on the output of the at least one sensor is equal to or less than the second reference value, which is higher than the first reference value.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of a vehicle and a control method for the same will be described in detail with reference to the accompanying drawings.

Figure 1:
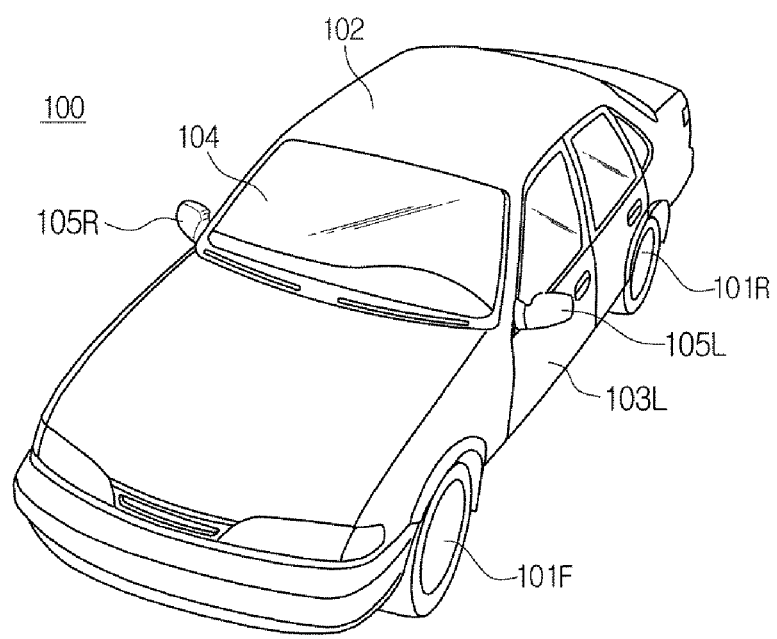
FIG. 1 is an exterior view of a vehicle according to an exemplary embodiment of the subject invention.
Figure 2:
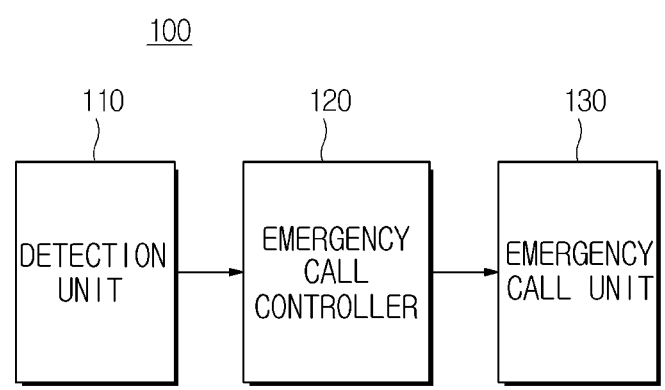
FIGS. 2 and 3 are control block diagrams of the vehicle according to the exemplary embodiment of the subject invention.
Figure 3:
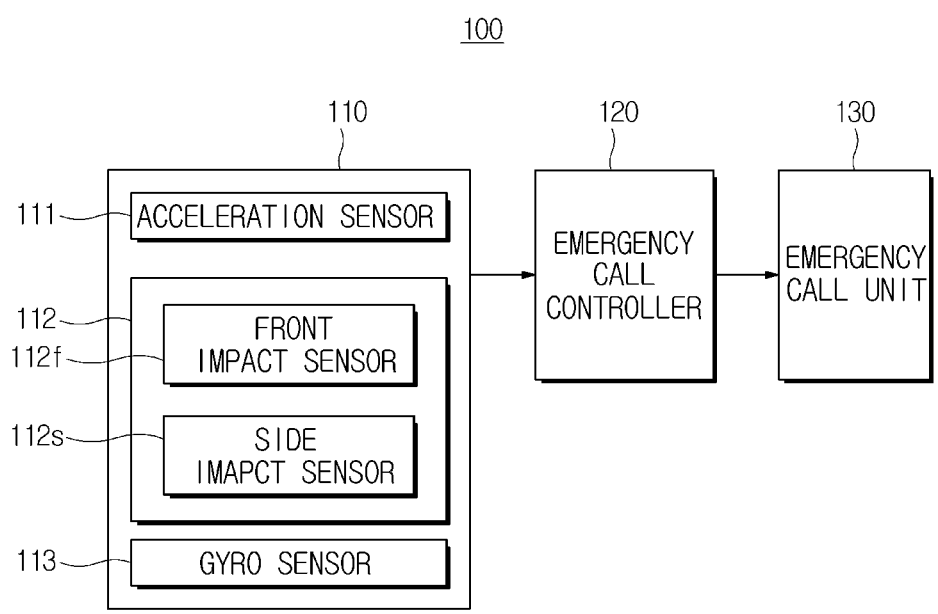

FIG. 1 is an exterior view of a vehicle according to an exemplary embodiment of the subject invention, and FIGS. 2 and 3 are control block diagrams of the vehicle according to the exemplary embodiment of the subject invention.

Referring to FIG. 1, a vehicle 100 includes wheels 101F and 101R to move the vehicle 100, a main body 102 to form an exterior of the vehicle 100, a driving device (not shown) to rotate the wheels 101F and 101R, doors 103 to shield an inner portion of the vehicle from the outside, a front glass 104 to provide a view in front of the vehicle to a river in the vehicle, and side mirrors 105L and 105R to provide a view behind the vehicle to the driver.

The wheels 101F and 101R include front wheels 101F provided at a front portion of the vehicle and rear wheels 101R provided at a rear portion of the vehicle, and the driving device provides a rotary force to the front wheels 101F or the rear wheels 101R such that the vehicle moves forward or backward. An engine that generates a rotary force by burning fossil fuel or a motor that generates a rotary force by receiving power from an electric power supply (not shown) may be employed as the driving device.

The doors 103 are rotatably provided at left and right sides of the main body 102 to allow the driver to enter/exit the vehicle 100 when opened and shield the inner portion of the vehicle 100 from the outside when closed.

The front glass 104 is provided at a front portion of the main body 102 to allow the driver in the vehicle 100 to acquire visual information of the front of the vehicle 100, and is also called a windshield glass.

In addition, the side mirrors 105L and 105R include a left side mirror 105L provided at the left side of the main body 102 and a right side mirror 105R provided at the right side thereof, and allow the driver in the vehicle 100 to acquire visual information of the side surfaces and the rear of the main body 102.

Referring to FIG. 2, the vehicle 100 includes a detection unit 110 to detect a state of the vehicle, an emergency call controller 120 to determine whether an emergency has occurred in the vehicle based on output data of the detection unit 110, and an emergency call unit 130 to perform an emergency call to a public safety answering position (PSAP) when an emergency has occurred in the vehicle.

The detection unit 110 may include a plurality of sensors capable of detecting whether an impact is applied to the vehicle. Various types of sensors capable of detecting the impact applied to the vehicle will be described later.

For example, the emergency call controller 120 may determine whether to perform an emergency call using an airbag deployment condition. Here, determining whether to perform an emergency call refers to determining whether the emergency call is required, i.e. whether an emergency has occurred. The airbag deployment condition may be determined based on an output of the detection unit 110.

Whether to deploy an airbag is determined by an airbag control unit to be described below. The determination of an airbag deployment condition may be very strict to decide whether to deploy the airbags since the airbag may instead cause an injury to an occupant when the airbag is deployed in a situation where the deployment of the airbags is not required. Here, deciding whether to deploy the airbags refers to determining whether a situation requires the deployment of the airbags.

However, when an excessively strict condition is applied also to a case of determining whether to perform the emergency call, a function of the emergency call unit 130 may not be properly performed, e.g. an immediate notification may not be possible in a case where rescuing is required even though the airbag is not deployed.

Consequently, different determination standards may be applied to a case of determining whether to deploy the airbags and a case of determining whether to perform the emergency call.

In one example, the emergency call controller 120 may determine that a situation requires the emergency call when at least one of a plurality of airbag deployment conditions is satisfied and transmit a trigger signal for the emergency call, i.e. an emergency call signal, to the emergency call unit 130.

That is, a trigger signal for an airbag deployment, i.e. an airbag deployment signal, may be generated when all of the plurality of airbag deployment conditions are satisfied in the case of determining whether to deploy the airbags, and the emergency call signal may be generated even when one of the airbag deployment conditions is satisfied in the case of determining whether to perform the emergency call.

In addition, the threshold condition for the airbag deployment that causes the emergency call signal to be generated may be appropriately adjusted by a designer or a user. For example, the emergency call signal is generated when two or more of the airbag deployment conditions are satisfied, or the emergency call signal is generated when three or more of the airbag deployment conditions are satisfied. In other words, the emergency call signal may be generated when at least m airbag deployment conditions (m is an integer equal to or greater than 1 and less than n) of n airbag deployment conditions (n is an integer equal to or greater than 2) are satisfied, and m may be appropriately adjusted by the designer or the user.

In the exemplary embodiment, any signal that enables an element to perform a specific operation when sent to the element may be a trigger signal, and the types of the trigger signal, information included therein, intensity thereof, and the like are not limited.

When the trigger signal is transmitted to the emergency call unit 130, the emergency call unit 130 may automatically transmit the emergency call to the PSAP. Here, the emergency call unit 130 may also transmit a position of the vehicle 100 together.

The PSAP may refer to preset institutions such as a dispatch center for emergency services, a police station, a fire station, an emergency medical care center, etc. that are capable of providing assistance (e.g., emergency services and/or rescue) when an accident has occurred in the vehicle.

Meanwhile, the user may also manually perform the emergency call. For this, a button capable of triggering the emergency call unit 130 may be provided in the vehicle 100, and the emergency call unit 130 may transmit the emergency call to the PSAP when the user manipulates the button.

Referring to FIG. 3, the detection unit 110 may include an acceleration sensor 111, an impact sensor 112, and a gyro sensor 113.

The impact sensor 112 may detect an impact applied to the vehicle 100 and output an impact strength data.

The impact sensor 112 may include a front impact sensor 122F mounted on a front surface of the vehicle 100 and a side impact sensor 122S mounted on a side surface of the vehicle 100.

In addition, the front impact sensor 122F may be mounted on a side of a driver's seat and a side of a passenger seat, and the side impact sensor 122S may also be mounted at left and right sides.

The gyro sensor 113 is a sensor to measure an attitude of an object and may measure changes in pitch axes, yaw axes, and roll axes orthogonal to each other. The gyro sensor 113 mounted on the vehicle 100 may measure a rotational angular velocity of the vehicle with respect to each axis and determine an attitude of the vehicle based on output data of the gyro sensor 113.

The data output from the detection unit 110 may be used in entirety or partially in accordance with an impact determination algorithm or an airbag deployment condition determination algorithm executed by the emergency call controller 120. In the exemplary embodiment of the vehicle 100, types of sensors used in determining whether a situation requires the emergency call are not limited.

Figure 9:
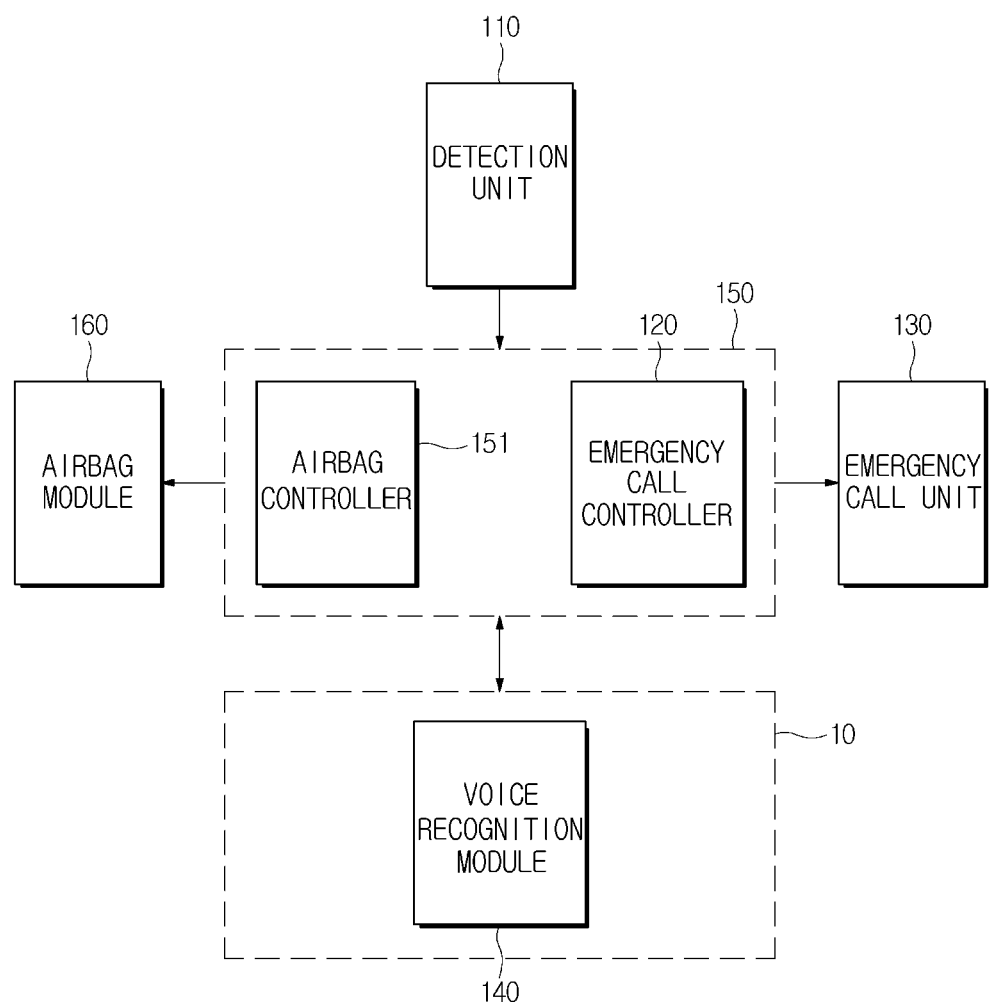
FIGS. 9 and 10 are views respectively illustrating a control block diagram related to a case where an airbag control unit determines also whether an emergency call is required and a signal flow.

Meanwhile, the emergency call controller 120 may be included in a head unit (H/U) 10 of the vehicle 100 or included in an airbag control unit 150 (refer to FIG. 9). The emergency call controller 120 may also be included in another unit of the vehicle 100 other than the above, and may also be implemented as a separate independent unit. That is, only whether to perform the emergency call has to be determined by applying a different standard from the case of determining whether to deploy the airbags in accordance with the above-mentioned steps, and a position at which the emergency call controller 120 is provided is not limited.

Hereinafter, a case where the emergency call controller 120 is included in the H/U of the vehicle 100 will be described as an example with reference to FIGS. 4 to 8 for detailed description.

Figure 4:
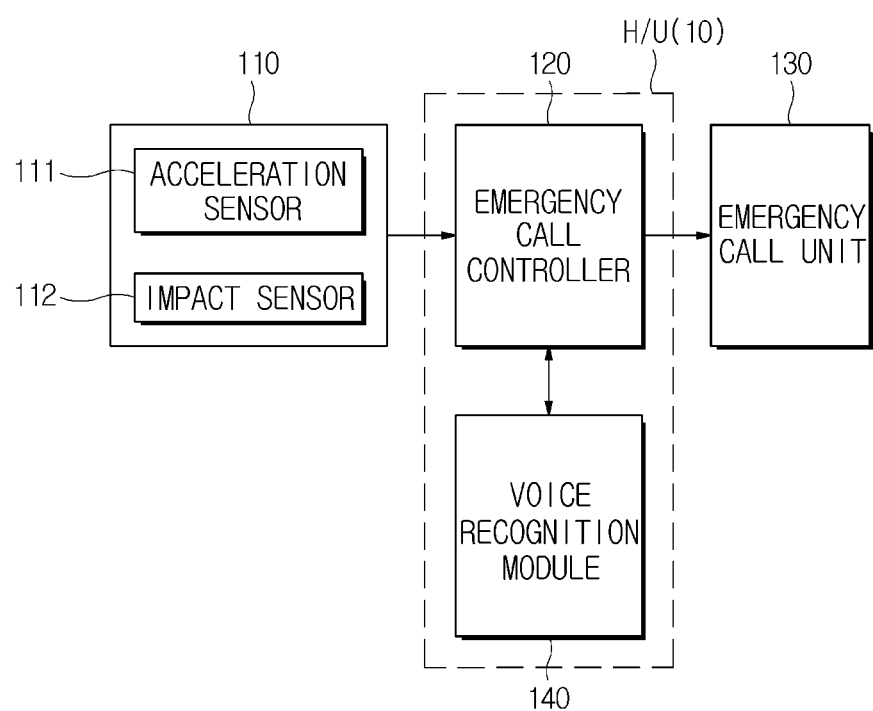
FIG. 4 is a control block diagram related to a case where an emergency call controller is included in a head unit of the vehicle.
Figure 5:
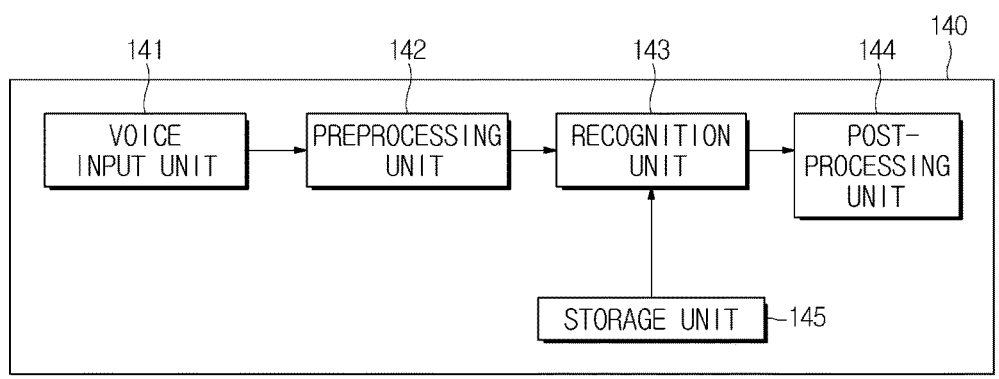
FIG. 5 is a control block diagram that has specified a configuration of a voice recognition module.

FIG. 4 is a control block diagram related to a case where an emergency call controller is included in a head unit of the vehicle, and FIG. 5 is a control block diagram that has specified a configuration of a voice recognition module.

Referring to FIG. 4, the emergency call controller 120 may be included in the H/U 10 of the vehicle 100, and the H/U 10 may further include a voice recognition module 140.

As mentioned above, the emergency call controller 120 may determine whether a situation requires the emergency call using the output data of the detection unit 110. Also, when it is determined that the situation requires the emergency call, reliability of the emergency call may be improved by performing additional confirmation to determine whether a request for assistance/rescue has been input by the user instead of immediately transmitting the trigger signal to the emergency call unit 130.

For example, one or more words corresponding to a request for assistance/rescue of the user, i.e. the one or more words that may be deemed as the request for assistance/rescue of the user or one or more words corresponding to an emergency, i.e. the one or more words that imply that an emergency has currently occurred in the vehicle may be pre-stored, and the trigger signal may be transmitted to the emergency call unit 130 when it is determined that the pre-stored one or more words have been input (uttered) as a result of recognizing the user's voice by the voice recognition module 140. Here, the user may include every occupant of the vehicle.

Referring to FIG. 5, the voice recognition module 140 includes a voice input unit 141 to receive a voice signal from a user as an input, a preprocessing unit 142 to perform preprocessing with respect to the input voice signal, a recognition unit 143 to recognize the preprocessed voice signal, a post-processing unit 144 to perform post-processing with respect to a voice recognition result, and a storage unit 145 to store a model used in voice recognition.

The voice input unit 141 may include a microphone, and, when a user's uttered voice is input, the voice input unit 141 converts the voice to an electrical signal to be output to the preprocessing unit 142. The electrical signal is referred to as a voice signal.

The voice input unit 141 may further include an analog-digital converter to transmit a digital voice signal to the preprocessing unit 142, but the analog-digital converter may also be included in the preprocessing unit 142 such that an analog voice signal is output from the voice input unit 141 and the analog voice signal is converted to the digital voice signal in the preprocessing unit 142.

The preprocessing unit 142 may remove a noise signal from the voice signal and extract a feature vector. As an example, the preprocessing unit 142 may view a noise section instead of an actual voice section as an initial section of the input voice signal, and extract a signal included in the noise section as the noise signal. However, the method is merely an example of signal extraction, and the noise may also be extracted by other methods.

The preprocessing unit 142 may extract a feature from the voice signal, and here, the extracted feature may be in a vector form. For example, the preprocessing unit 142 may extract a feature vector by applying feature vector extraction technologies such as cepstrum, linear predictive coefficient (LPC), mel frequency cepstral coefficient (MFCC), or filter bank energy to the voice signal from which the noise signal is removed.

The recognition unit 143 may include a voice recognition engine to recognize a voice signal by comparing the extracted feature vector and a trained reference pattern. For example, the recognition unit 143 may use an acoustic model in which signal characteristics of voices are modeled and compared and a language model in which words corresponding to recognized one or more words or linguistic order relations such as syllables are modeled. The reference pattern or model used in comparing the feature vector may be stored in the storage unit 145.

The acoustic model may be divided as a direct comparison method in which a recognition target is set as a feature vector model again to be compared to a feature vector of voice data and a statistical method in which the feature vector of the recognition target is statistically processed for use.

The direct comparison method is a method of setting a unit such as a word and a phoneme that becomes a recognition target as a feature vector model and comparing it with an input voice to find how much similarity exists. A vector quantization method is a typical example of the direct comparison method. The vector quantization method is a method of mapping a feature vector of input voice data to a codebook which is a reference model such that the feature vector and the code book are encoded into representative values to compare the encoded values.

The statistical modeling method is a method of configuring a unit of a recognition target as a state sequence and using a relation between state sequences. The state sequences may be formed of a plurality of nodes. The method using the relation between state sequences include methods using dynamic time warping (DTW), hidden Markov model (HMM), and neural network.

The DTW is a method of compensating for a difference in a time base when comparing with the reference model by considering a dynamic characteristic of a voice in which a length of a signal varies according to time even when the same person utters the same pronunciation, and the HMM is a recognition technology in which a voice is assumed as a Markov process having a state transition probability and an observation probability of nodes (output symbols) in each state, the state transition probability and the observation probability of the nodes are estimated by learned data, and a probability that a voice input from the estimated model will be generated is calculated.

Meanwhile, the linguistic model that models the linguistic order relations such as words or syllables applies order relations between units forming a language to units obtained from voice recognition, thereby reducing acoustic ambiguity and a recognition error. The linguistic model includes a model based on a statistical linguistic model and finite state automata (FSA), and a chain probability of words such as unigram, bigram, and trigram is used in the statistical linguistic model.

The recognition unit 143 may use any method among the above-mentioned methods to recognize a voice.

The recognition result of the recognition unit 143 may include an error. Consequently, the post-processing unit 144 may detect the error included in the recognition result by applying one of various post-processing algorithms and correct the error. However, the post-processing unit 144 may also be omitted since the post-processing unit 144 is not an essential element of the voice recognition module 140.

Meanwhile, the preprocessing unit 142, the recognition unit 143, and the post-processing unit 144 may include a program required to perform respective operations, a memory to store various types of data such as algorithms, and a processor to process data by executing a program stored in the memory.

Some or all of the preprocessing unit 142, recognition unit 143, and post-processing unit 144 may share a processor or a memory. That is, one processor may perform functions of some or all of the preprocessing unit 142, recognition unit 143, and post-processing unit 144, or one memory may store data required by some or all of the preprocessing unit 142, recognition unit 143, and post-processing unit 144.

The storage unit 145 may include at least one of non-volatile memories such as a flash memory, a read-only memory (ROM), an erasable programmable read-only memory (EPROM), and an electrically erasable programmable read-only memory (EEPROM), and may further include at least one of volatile memories such as a random access memory (RAM), a static random access memory (S-RAM), and a dynamic random access memory (D-RAM).

The preprocessing unit 142, the recognition unit 143, and the post-processing unit 144 may share a memory with the storage unit 145 or have a separate memory.

In addition, the processor and the memory may be realized as a single element depending on its capacity, may also be realized as multiple elements, may be realized by being physically separated, and may be realized as a single chip.

For example, when the emergency call controller 120 determines that a situation requires the emergency call, the emergency call controller 120 transmits the trigger signal to the voice recognition module 140 to activate the voice recognition module 140. When the voice recognition module 140 is activated, the voice input unit 141 is turned on.

When the voice recognition module 140 determines that one or more words such as "Help me," "Rescue me," or a scream corresponding to the pre-stored request for assistance/rescue is input, the emergency call controller 120 may transmit the trigger signal to the emergency call unit 130.

When the voice recognition module 140 has not recognized an input of one or more words corresponding to the pre-stored request for assistance/rescue, the emergency call signal is not transmitted to the emergency call unit 130, thus improving reliability of the emergency call.

Figure 6:
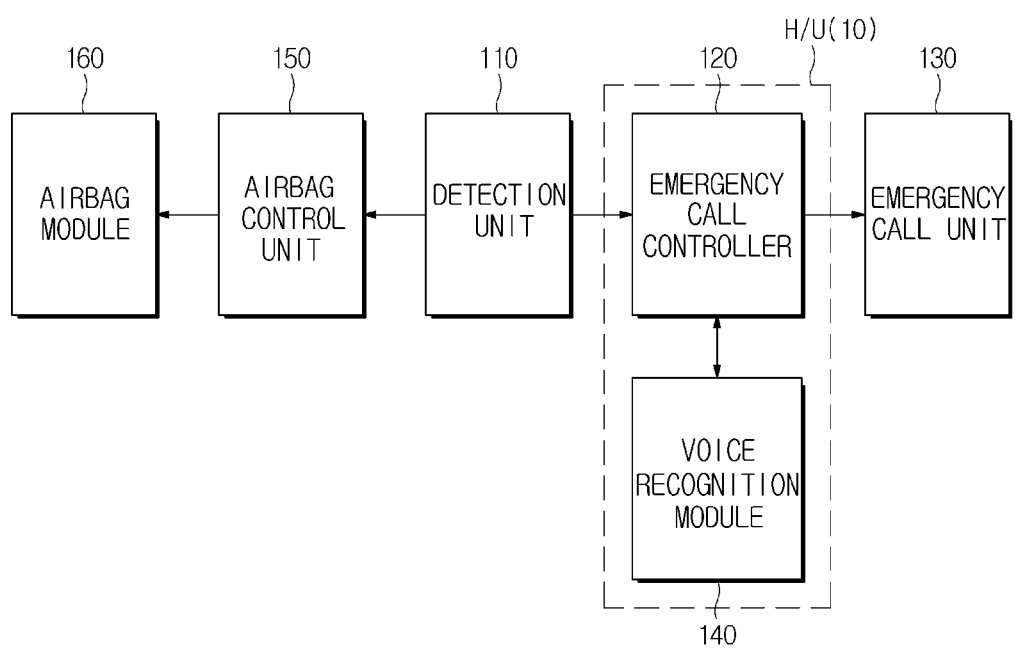
FIG. 6 is a control block diagram of the vehicle further including an element related to an airbag deployment.
Figure 7:
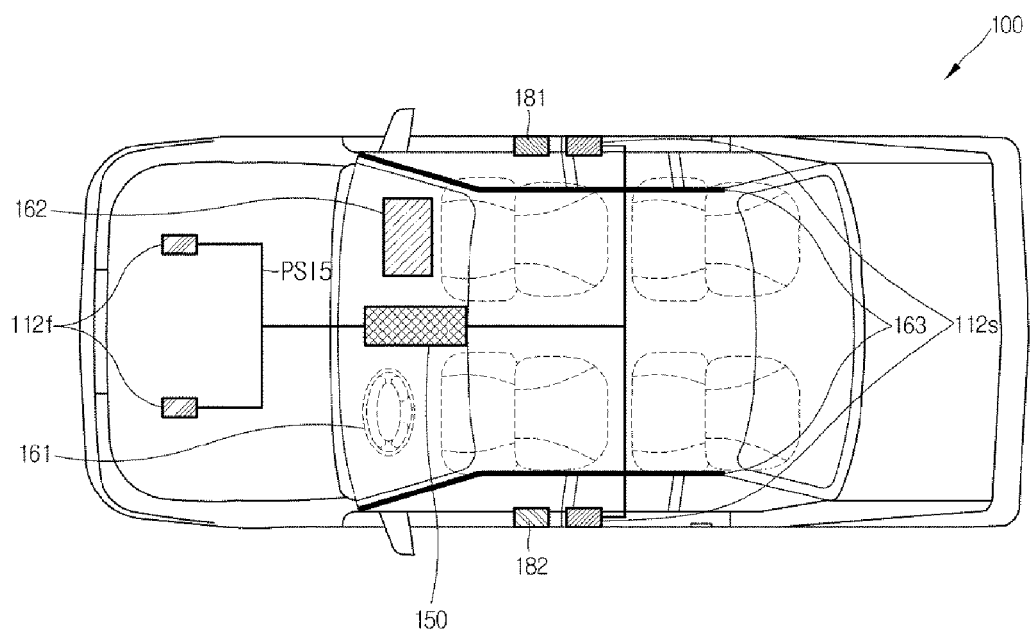
FIG. 7 is an exterior view of the vehicle further including an element related to an airbag deployment.
Figure 8:
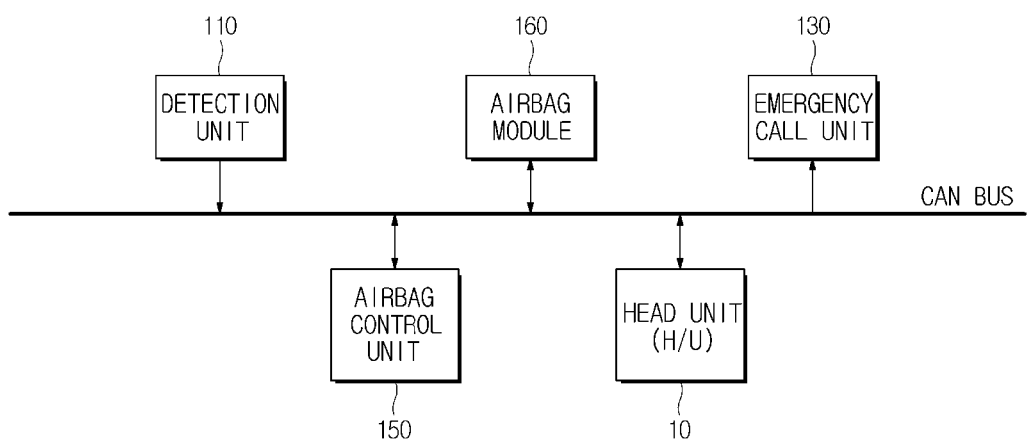
FIG. 8 is a view illustrating a signal flow of each unit.

FIG. 6 is a control block diagram of the vehicle further including an element related to airbag deployment, FIG. 7 is an exterior view of the vehicle further including an element related to airbag deployment, and FIG. 8 is a view illustrating a signal flow of each unit.

Referring to FIG. 6, the output data of the detection unit 110 is also transmitted to the airbag control unit 150. The airbag control unit 150 may determine the airbag deployment condition based on the output data of the detection unit 110 and transmit the airbag deployment signal to an airbag module 160 when it is finally determined that the airbag needs to be deployed.

The airbag deployment condition determined by the airbag control unit 150 may be the same as the airbag deployment condition determined by the emergency call controller 120. However, the airbag control unit 150 may generate the airbag deployment signal when all of the plurality of airbag deployment conditions are satisfied.

In addition, when the airbag deployment signal is generated, the trigger signal may also be transmitted to the emergency call unit 130.

Meanwhile, the airbag deployment conditions determined by the airbag control unit 150 or the emergency call controller 120 do not have to be in a plurality all the time. When the airbag deployment conditions is not in a plurality, different reference values, which become a standard of determining whether a condition is satisfied, may be applied to the airbag control unit 150 and the emergency call controller 120. Specifically, a lower standard may be applied to the emergency call controller 120.

For example, an algorithm or logic determined as satisfying the airbag deployment condition may be used when a specific value calculated based on the output of the detection unit 110 is equal to or greater than or equal to or less than a preset reference value.

In this case, the airbag control unit 150 may determine that the airbag deployment condition is satisfied when a result calculated based on the output of the detection unit 110 is equal to or greater than the first reference value, and the emergency call controller 120 may determine that the airbag deployment condition is satisfied when the result calculated based on the output of the detection unit 110 is equal to or greater than the second reference value, which is lower than the first reference value.

As a detailed example, when it is determined that the airbag deployment condition is satisfied when a valid collision speed is equal to or greater than the reference value within 30° horizontally, the reference value may be set as 20 km/h in the airbag control unit 150, and the reference value may be set as 15 km/h which is lower than 20 km/h in the emergency call controller 120.

In this case, when the valid collision speed is 17 km/h, the airbag control unit 150 may determine that the airbag deployment condition is not satisfied and not generate the airbag deployment signal, whereas the emergency call controller 120 may determine that a situation requires the emergency call and transmit the emergency call signal to the emergency call unit 130.

Meanwhile, the airbag control unit 150 may include a central processing unit (CPU) and/or a main control unit (MCU), and operations of the airbag control unit 150 mentioned above or to be described below may be performed by an airbag controller implemented by the CPU or MCU.

Referring to an example in FIG. 7, the airbag module 160 may include a driver seat airbag 161 mounted on a steering wheel of a driver's seat, a passenger seat airbag 162 mounted on a dashboard, and a curtain airbag 163 mounted on a loop rail of the vehicle 100. Also, a side airbag mounted on the doors may be further provided separately from the curtain airbag 163.

In addition, the airbag module 160 may further include an inflator to generate a gas to be injected into the airbags 161, 162, and 163. A gunpowder ignition type inflator may include an ignition circuit, an ignition agent, a gas foaming agent, a gas filter, etc. A gunpowder is burned when a current flows in the ignition circuit, and heat is generated when the ignition agent is burned due to the burning of the gunpowder, thus causing the gas foaming agent to burn. A nitrogen gas may be rapidly generated by the burning of the gas foaming agent, a foreign substance may be removed while the nitrogen gas passes through the gas filter, and the nitrogen gas may be introduced into the airbags in a lowered-temperature state.

The airbags 161, 162, and 163 may be formed of a nylon material, and may discharge the nitrogen gas through a discharge hole after being expanded by the nitrogen gas introduced from the inflator to prevent occupants from being pressed by the airbags.

The above-mentioned structure of the airbag module 160 is merely an example that may be applied to the vehicle 100, and a structure other than the above may also be applied.

A controller area network (CAN), a local interconnection network (LIN), a media oriented systems transport (MOST), FlexRay, Ethernet, etc. may be used as a communication protocol inside the vehicle 100. Hereinafter, a case of using a CAN communication will be described as an example.

For example, a plurality of electronic control units (ECUs) may transmit CN signals to one CAN bus, or request required CAN signals. Here, each of the ECUs may serve as a node in the CAN communication, and the CAN signals may be transmitted in a message form.

Each of the ECUs may include a CAN controller to generate a CAN signal to be transmitted, and a CAN driver to transmit the CAN signal to a CAN bus or receive the CAN signal from the CAN bus.

Referring to FIG. 8, the data output from the detection unit 110 may be transmitted to the airbag control unit 150 and the emergency call controller 120 of the H/U 10 via the CAN bus, and the airbag deployment signal output from the airbag control unit 150 may be transmitted to the airbag module 160 via the CAN bus.

In addition, the emergency call signal output from the emergency call controller 120 of the H/U 10 may be transmitted to the emergency call unit 130 also via the CAN bus.

The CAN communication may be divided as a high speed CAN and a low speed CAN. The high speed CAN may be used since a rapid communication should be performed between the detection unit 110, the airbag control unit 150, the airbag module 160, the emergency call unit 130, and the emergency call controller 120.

However, the vehicle 100 is not limited to the communication network of FIG. 8, and communication protocols other than the CAN may be used, or only some of the above elements may communicate via the CAN and others may use another communication protocol.

For example, Peripheral Sensor Interface 5 (PSI5) may be used in the communication between the detection unit 110, the airbag control unit 150, and the emergency call controller 120.

In addition, a hardwired interface may be used in the communication between the emergency call controller 120 and the emergency call unit 130.

Meanwhile, when it is determined by the airbag control unit 150 that the deployment of the airbags is required, the trigger signal is transmitted to both airbag module 160 and emergency call unit 130. That is, the trigger signal transmitted from the emergency call controller 120 and the airbag control unit 150 may overlap.

Consequently, whether the emergency call has already been transmitted may be determined before the emergency call controller 120 transmits the emergency call signal to the emergency call unit 130. Also, when the emergency call has already been transmitted, the emergency call signal may not be transmitted to the emergency call unit 130. In this case, overlapping triggers are prevented while allowing the emergency call signal to be transmitted from the other side even when the emergency call signal has not been normally transmitted from one side, thereby improving safety.

Figure 10:
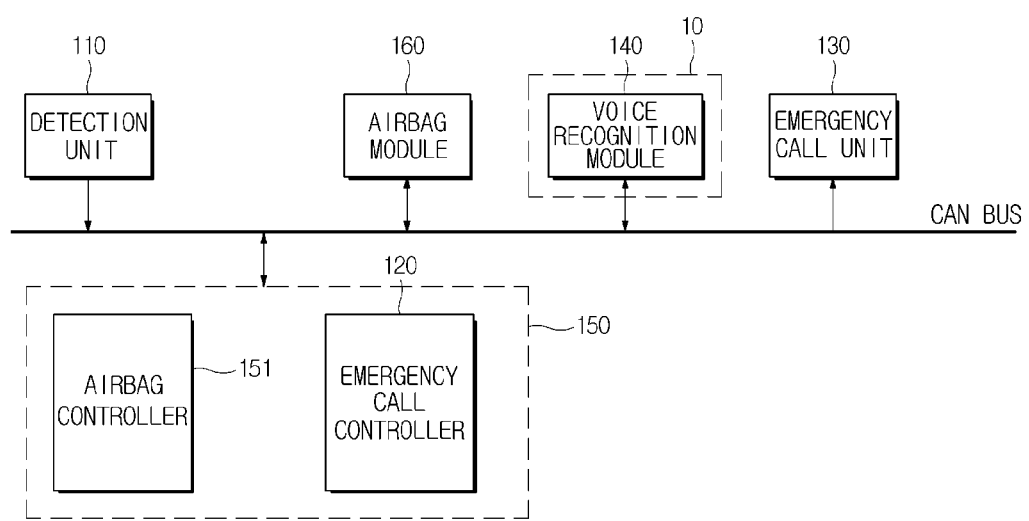

FIGS. 9 and 10 are views respectively illustrating a control block diagram related to a case where an airbag control unit determines also whether an emergency call is required and a signal flow.

In the above embodiments of the subject invention, the case where the emergency call controller 120 is included in the H/U 10 has been described. As illustrated in FIGS. 9 and 10, the emergency call controller 120 may also be included in the airbag control unit 150.

When the output data of the detection unit 110 is input to the airbag control unit 150, an airbag controller 151 and the emergency call controller 120 may determine whether to deploy the airbags and whether the emergency call is required based on the output data of the detection unit 110.

The airbag controller 151 may perform an operation that has already been performed by the airbag control unit 150, i.e. determine whether to deploy the airbags. Consequently, when it is determined by the airbag controller 151 that the deployment of the airbags is required, the trigger signal may be transmitted to the airbag module 160. Also, although it is not illustrated in the drawings, the trigger signal may also be transmitted to the emergency call unit 130.

When the emergency call controller 120 determines that the emergency call is required, the emergency call controller 120 may transmit the trigger signal to the voice recognition module 140 to activate the voice recognition module 140. Also, when the voice recognition module 140 recognizes one or more words corresponding to the pre-stored request for assistance/rescue, the result may be transmitted back to the emergency call controller 120 as illustrated in FIG. 9. In this case, the recognized one or more words or a result value of yes/no on whether one or more words corresponding to the preset request for assistance/rescue has been recognized may be transmitted from the voice recognition module 140.

In the former case, whether the one or more words recognized by the emergency call controller 120 is the one or more words corresponding to the preset request for assistance/rescue may be determined. When the recognized one or more words corresponds to the preset request for assistance/rescue, the trigger signal may be transmitted to the emergency call unit 130. Also, overlapping triggers may be prevented by determining whether the emergency call has already been transmitted before transmitting the trigger signal to the emergency call unit 130.

In addition, when the recognized one or more words is output from the voice recognition module 140, whether the one or more words recognized by the MCU or CPU provided at the H/U 10 is the one or more words corresponding to the preset request for assistance/rescue may be determined. In this case, transmitting the trigger signal from the H/U 10 to the emergency call unit 130 is also possible without transmitting a signal back to the emergency call controller 120.

Meanwhile, the airbag controller 151 and the emergency call controller 120 may be implemented by separate logics. In this case, the airbag controller 151 and the emergency call controller 120 may be implemented using a separate processor or a separate CPU or MCU. Or, the airbag controller 151 and the emergency call controller 120 may share the CPU or MCU even when implemented by the separate logics.

When the airbag controller 151 and the emergency call controller 120 are implemented by the separate logics, a convenience in design may be improved since only the logic of the emergency call controller 120 has to be added without revising the existing airbag controller 151.

Or, the airbag controller 151 and the emergency call controller 120 may also be implemented by the same logic. That is, an existing logic of the airbag control unit 150 may be changed to be able to determine both whether the airbag deployment is required and whether the emergency call is required.

As a detailed example, an algorithm executed by one CPU or MCU included in the airbag control unit 150 may be changed from determining only whether all of the airbag deployment conditions are satisfied and outputting the result thereof to also outputting a result of whether each of the airbag deployment conditions is satisfied or whether a preset critical value (m) or more of the airbag deployment conditions are satisfied.

When all of the plurality of airbag deployment conditions are satisfied, the trigger signal may be immediately transmitted to the emergency call unit 130 and the airbag module 160 without activating the voice recognition module 140.

When the airbag controller 151 and the emergency call controller 120 are implemented by the same logic, component utilization per chip may be improved, an additional processor is not required, and overlapping input of the trigger signal to the emergency call unit 130 or an unnecessary performance of voice recognition may be prevented.

Figure 11:
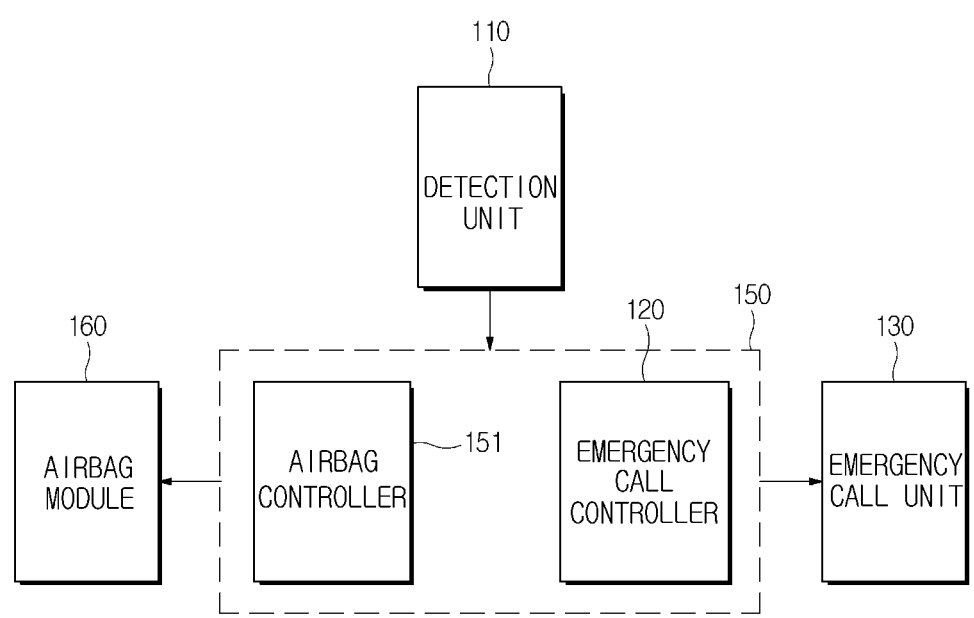
FIGS. 11 and 12 are control block diagrams of a vehicle capable of performing an emergency call even when a request for rescue is not input.
Figure 12:
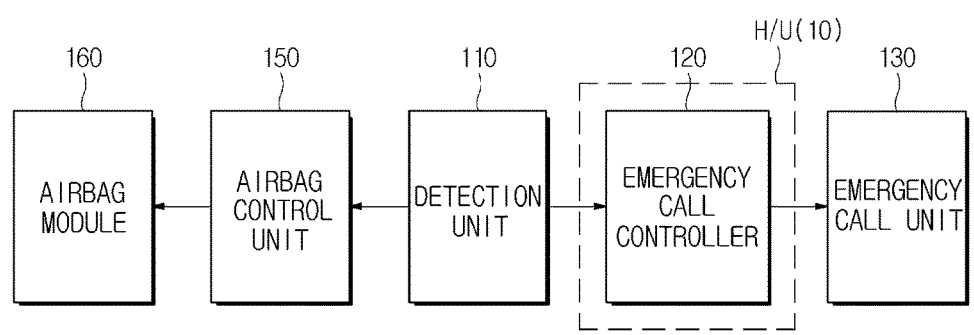

FIGS. 11 and 12 are control block diagrams of a vehicle capable of performing an emergency call even when a request for assistance/rescue is not input.

In the above-mentioned embodiment, the trigger signal was transmitted to the emergency call unit when it is determined that a situation requires the emergency call and the request for assistance/rescue is input. However, the embodiments of the vehicle 100 are not limited thereto, and the trigger signal may also be immediately transmitted to the emergency call unit 130 without performing voice recognition.

In both of the case where the emergency call controller 120 is included in the airbag control unit 150 as illustrated in FIG. 11 and the case where the emergency call controller 120 is included in the H/U 10 as illustrated in FIG. 12, when it is determined that a situation requires the emergency call as a result of determining based on the output data of the detection unit 110, the trigger signal may be transmitted to the emergency call unit 130 without performing the voice recognition.

According to the subject invention, the emergency call is transmitted even when the request for assistance/rescue is not input although a situation corresponds to an emergency, e.g. when a user is unable to make a sound due to severe injury, thereby securing safety of an occupant.

Hereinafter, embodiments related to a control method for a vehicle will be described. To perform the control method for a vehicle, the above-mentioned vehicle 100 may be applied. Consequently, the description referenced to FIGS. 1 to 12 may also be applied to the control method for a vehicle to be described below.

Figure 13:
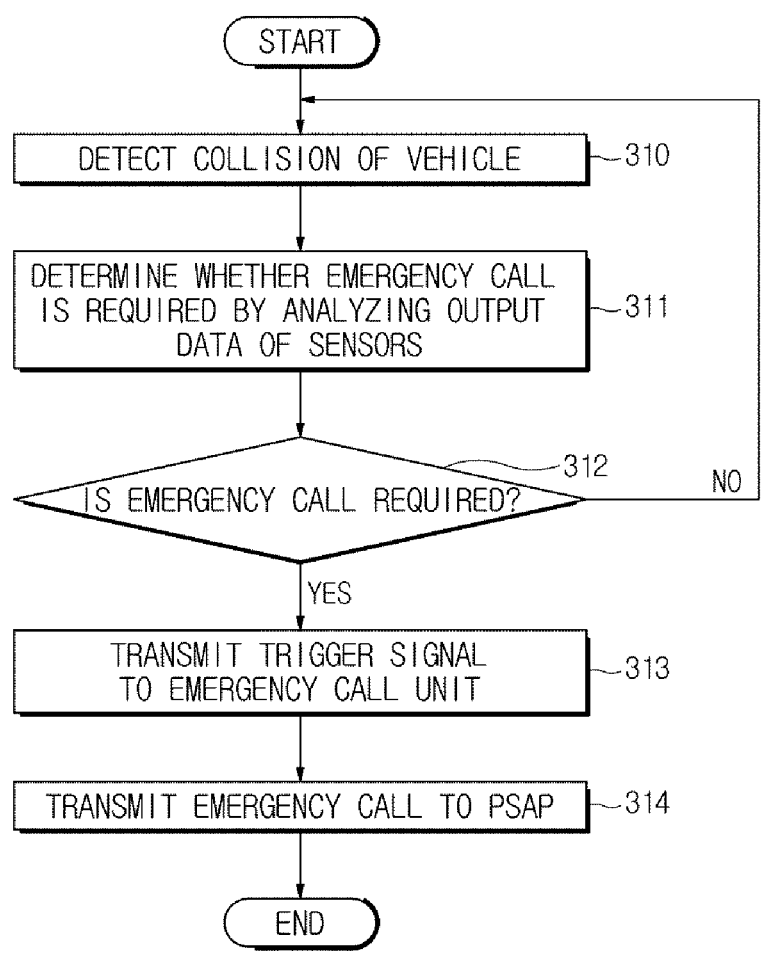
FIG. 13 is a flow chart related to a control method for a vehicle according to the subject invention.

FIG. 13 is a flow chart related to a control method for a vehicle according to the subject invention.

Referring to FIG. 13, a collision of a vehicle is detected (S310). The collision of the vehicle 100 may be detected by the detection unit 110 mounted on the vehicle 100, and the detection unit 110 may include, for example, the acceleration sensor 111, the impact sensor 112, and the gyro sensor 113.

Whether a situation requires an emergency call is determined by analyzing the output data of the sensors (S311). For example, the emergency call controller 120 may determine whether to perform the emergency call using the airbag deployment conditions. Specifically, the emergency call controller 120 may determine that the situation requires the emergency call when at least one of the plurality of airbag deployment conditions is satisfied. Also, when the number of the airbag deployment conditions is not plural, different critical values, which become a standard of determining whether a condition is satisfied, may be applied to the airbag control unit 150 and the emergency call controller 120. Specifically, a lower standard may be applied to the emergency call controller 120.

When it is determined that a situation requires the emergency call (YES to S312), a trigger signal is transmitted to the emergency call unit (S313), and the triggered emergency call unit transmits the emergency call to the PSAP (S314).

The airbag control unit 150 also receives the output data from the detection unit 110 and determines whether to deploy the airbags using the output data of the sensors. When it is determined that the deployment of the airbags is required, the trigger signal may be transmitted to the airbag module 160. Here, the trigger signal is automatically transmitted also to the emergency call unit 130. The airbag deployment signal may become the trigger signal of the emergency call unit 130 or a separate trigger signal for the emergency call unit 130 may be transmitted.

Meanwhile, a case where the airbag control unit 150 has determined that the deployment of the airbags is required corresponds to a case where the emergency call controller 120 to which a lower standard is applied has also determined that the emergency call is required. Consequently, since overlapping trigger signals may be transmitted to the emergency call unit 130, an embodiment to prevent the overlapping trigger signals from being transmitted will be described with reference to FIG. 14.

Figure 14:
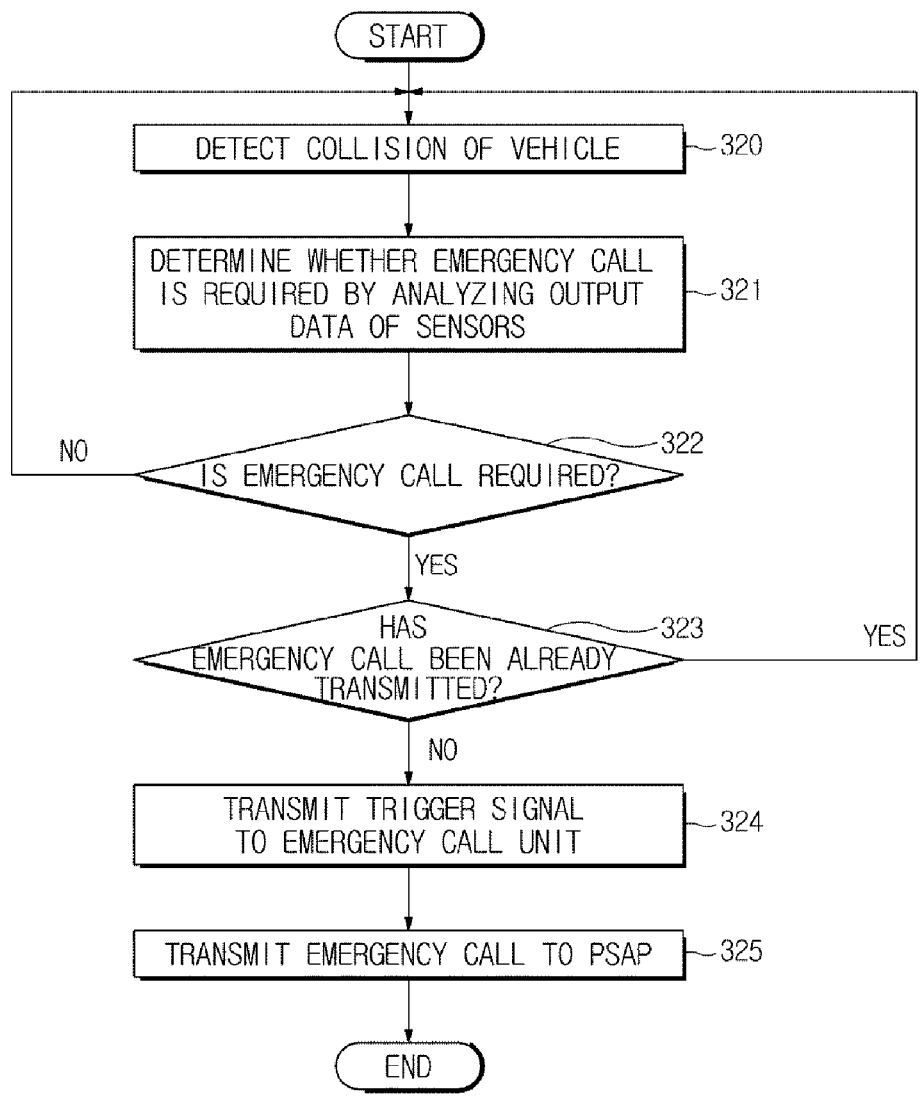
FIG. 14 is a flow chart related to an example of preventing overlapping triggers of an emergency call unit in the control method for the vehicle according to the subject invention.

FIG. 14 is a flow chart related to an example of preventing overlapping triggers of an emergency call unit in the control method for the vehicle.

Referring to FIG. 14, detecting a collision of a vehicle (S320) and determining whether the emergency call is required based on the output data of the sensors are the same as the above description with reference to FIG. 13.

When it is determined that the emergency call is required (YES to S322), whether the emergency call has been already transmitted is first determined (S323).

The trigger signal is not transmitted to the emergency call unit when the emergency call has already been transmitted (YES to S323), and the trigger signal is transmitted to the emergency call unit when the emergency call has not been transmitted (NO to S323).

The triggered emergency call unit 130 transmits the emergency call to the PSAP (S325).

A position of the emergency call controller 120 is not limited in both of the embodiments of FIGS. 13 and 14. Consequently, the emergency call controller 120 may be included in the H/U 10 of the vehicle 100 or may be included in the airbag control unit 150.

Whether a request for assistance/rescue has been input is not determined in the embodiments of FIGS. 13 and 14. In this case, the emergency call is transmitted even when the request for assistance/rescue is not input although a situation corresponds to an emergency, e.g. when a user is unable to make a sound due to severe injury, thereby securing safety of an occupant.

Meanwhile, when it is determined that the emergency call is required, reliability of the emergency call may be improved when whether the request for assistance/rescue has been input is determined by performing voice recognition. Hereinafter, a control method for a vehicle that determines via voice recognition whether the request for assistance/rescue has been input will be described.

Figure 15:
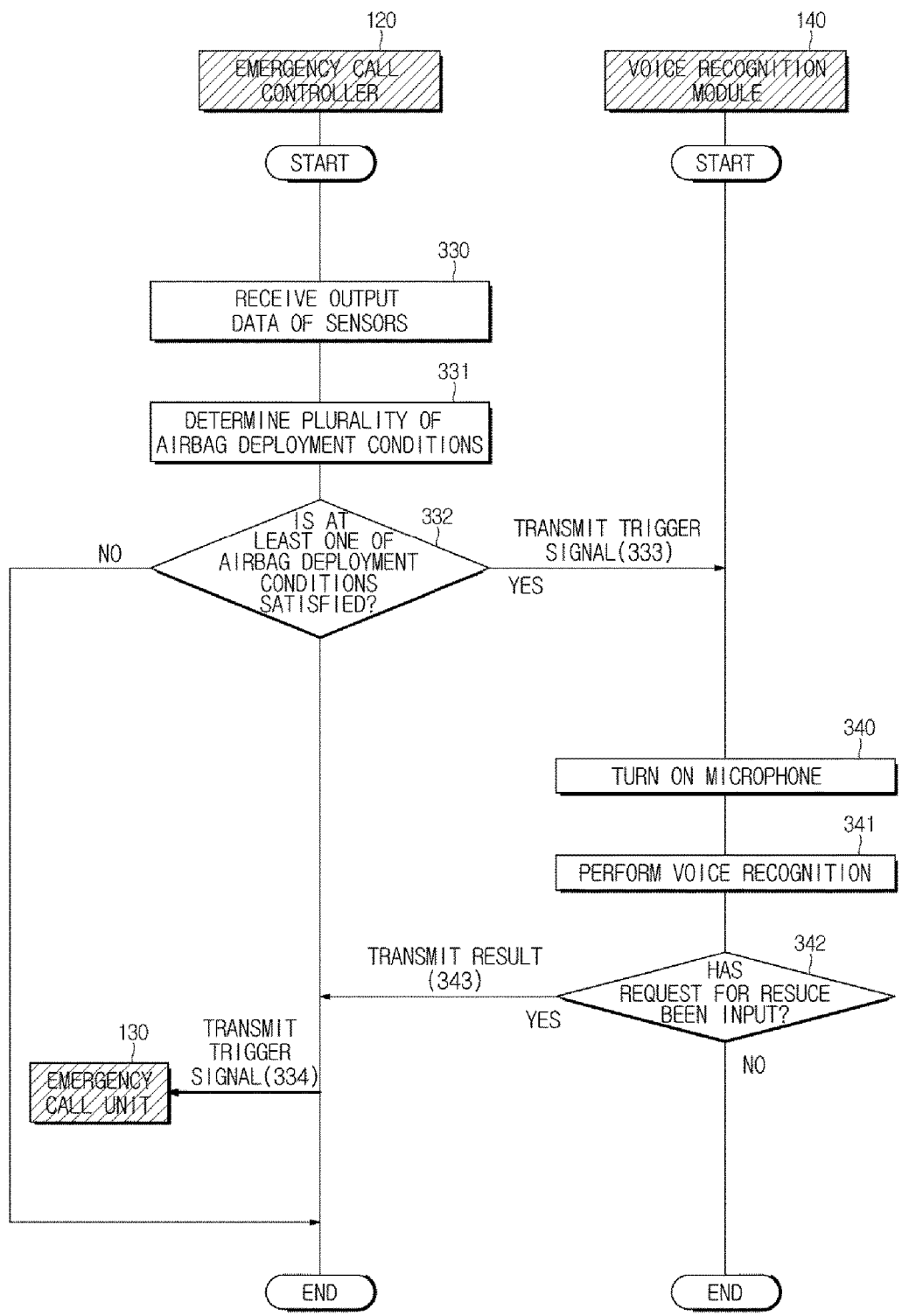
FIGS. 15 to 17 are flow charts related to a control method for a vehicle that determines via voice recognition whether a request for rescue has been input.
Figure 16:
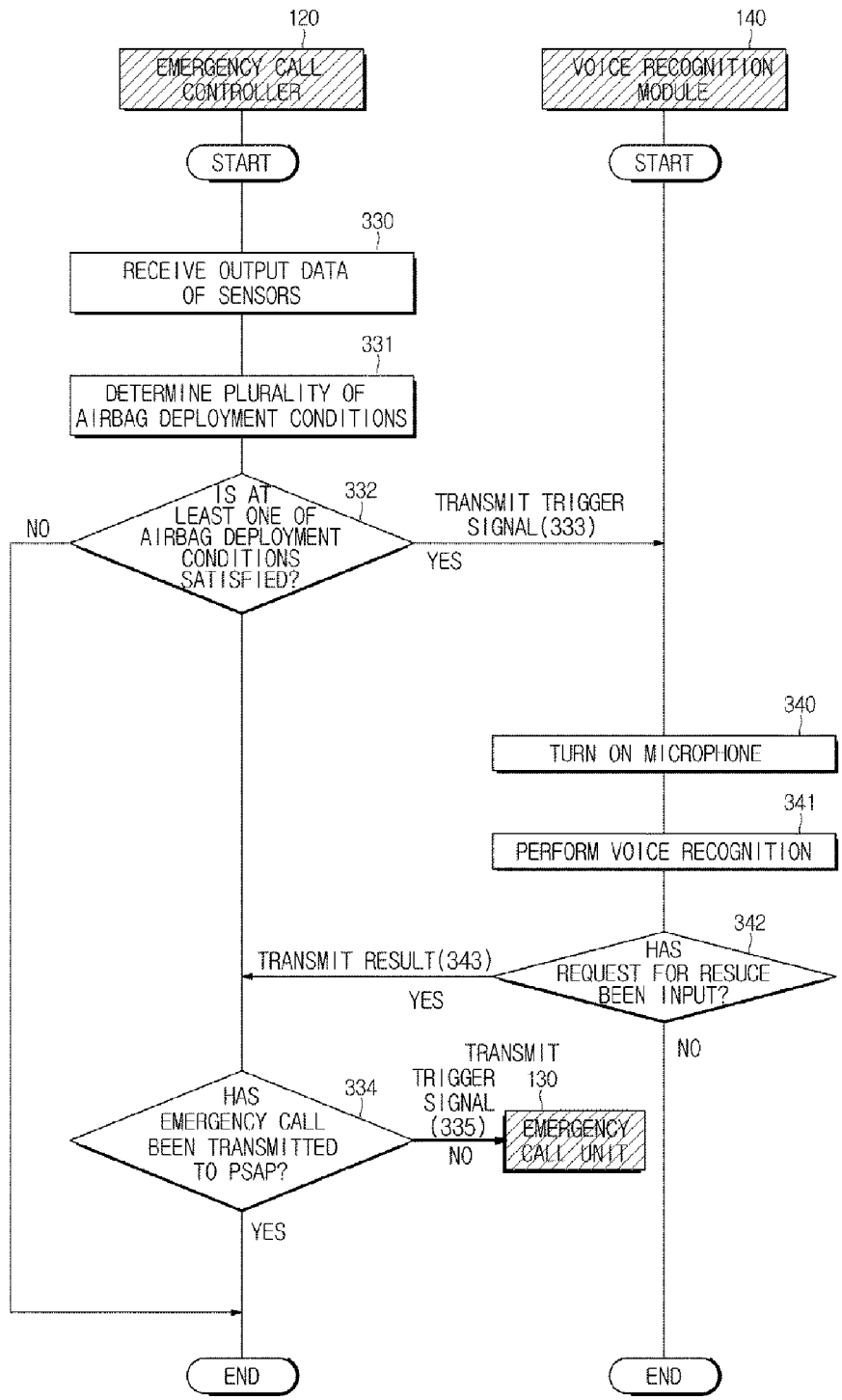
Figure 17:
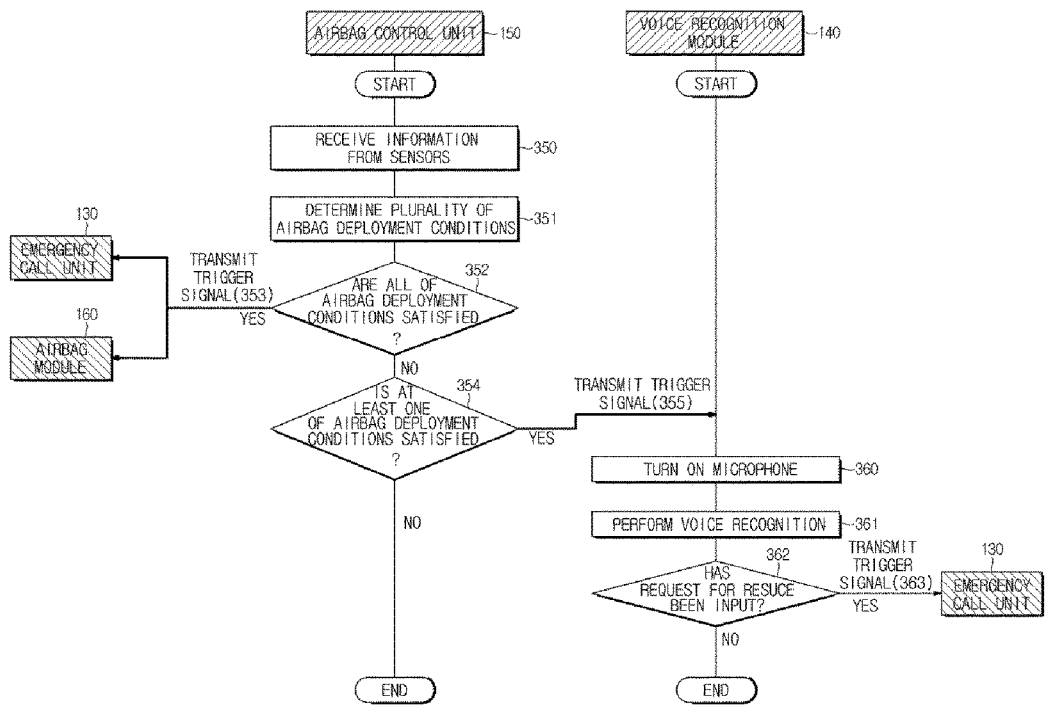

FIGS. 15 to 17 are flow charts related to a control method for a vehicle that determines via voice recognition whether a request for assistance/rescue has been input. In embodiments of FIGS. 15 to 17, whether the emergency call is required and whether the deployment of the airbags is required are determined using a plurality of airbag deployment conditions.

Referring to FIG. 15, the emergency call controller 120 receives the output data of the sensors from the detection unit 110 (S330), and determines the plurality of airbag deployment conditions based on the output data of the sensors (S331).

When at least one of the plurality of airbag deployment conditions is satisfied (YES to S332), the trigger signal is transmitted to the voice recognition module 140 (S333). This case corresponds to a case where a threshold value for the airbag deployment conditions is set as 1. Embodiments of the control method for a vehicle are not limited thereto, and the threshold value may also be set differently.

When the trigger signal is transmitted to the voice recognition module 140, a microphone is turned on (S340). Also, the preprocessing unit 142, the recognition unit 143, and the post-processing unit 144 may operate to perform a voice recognition (S341).

As a result of the voice recognition, when the request for assistance/rescue such as "Help me," "Rescue me," or a scream is input (YES to S342), the voice recognition module 140 transmits the recognition result to the emergency call controller 120 (S343), and the emergency call controller 120 transmits the trigger signal to the emergency call unit 130 (S334). In this case, one or more words corresponding to the preset request for assistance/rescue is stored in the storage unit 145 of the voice recognition module 140, and the voice recognition module 140 may determine whether a recognized one or more words is the one or more words corresponding to the preset request for assistance/rescue and transmit the result thereof to the emergency call controller 120.

Or, the voice recognition module 140 may recognize the one or more words included in the input voice signal and transmit the recognized one or more words to the emergency call controller 120, and the emergency call controller 120 may compare the recognized one or more words to the preset one or more words and determine whether the request for assistance/rescue has been input.

In addition, as illustrated in FIG. 16, when the voice recognition module 140 transmits the recognition result to the emergency call controller 120 (S343), the emergency call controller 120 may determine whether the emergency call has already been transmitted to the PSAP (S334), and transmit the trigger signal (S335) only when the emergency call has not been already transmitted. In this case, the emergency call unit 130 may be prevented from being triggered twice by the airbag control unit 150 and the emergency call controller 120.

In the above-mentioned embodiments of FIGS. 15 and 16, the emergency call controller 120 may be included in the airbag control unit 150 or may be included in the H/U 10.

An embodiment of FIG. 17 is related to a case where the emergency call controller 120 is included in the airbag control unit 150 and is integrally implemented with the airbag controller 151. That is, the embodiment of FIG. 17 relates to a case where whether to deploy the airbags and whether to perform the emergency call are determined using one logic. Referring to FIG. 17, the airbag control unit 150 may receive the output data of the sensors from the detection unit 110 (S350). In this case, a communication between the airbag control unit 150 and the detection unit 110 may use the CAN or use the PSI5.

The plurality of airbag deployment conditions are determined based on the output data of the sensors (S351).

When all of the plurality of airbag deployment conditions are satisfied (YES to S352), the trigger signal is transmitted to both of the emergency call unit 130 and the airbag module 160 (S353). In this case, the communication among the airbag control unit 150, the emergency call unit 130, and the airbag module 160 may use the CAN or use the hard wire.

Or, when at least one of the airbag deployment conditions is satisfied (YES to S354) although not all of the plurality of airbag deployment conditions are satisfied (NO to S352), the trigger signal is transmitted to the voice recognition module 140 (S355). The voice recognition module 140 turns on the microphone (S360) and performs voice recognition (S361).

As a result of the recognition, when it is determined that the request for assistance/rescue has been input (YES to S362), the voice recognition module 140 or the H/U 10 may directly transmit the trigger signal to the emergency call unit 130 (S363), or when the result is transmitted to the airbag control unit 150, the airbag control unit 150 may transmit the trigger signal to the emergency call unit 130. In the latter case, as mentioned above, the voice recognition module 140 may recognize the one or more words included in the input voice signal and transmit the recognized one or more words to the airbag control unit 150, and the airbag control unit 150 may compare the recognized one or more words to the preset one or more words and determine whether the request for assistance/rescue has been input.

According the above-mentioned embodiments, different standards are applied when determining whether an emergency call is required and when determining whether deployment of airbags is required, thereby adaptively dealing with a situation occurring in a vehicle.

The standard applied when determining whether the emergency call is required is lowered relative to the standard applied when determining whether the deployment of airbags is required, thereby an appropriate step may be taken even in an emergency where whether to deploy the airbags is irrelevant.

In addition, when it is determined that the emergency call is required, reliability of the emergency call may be improved by confirming via the voice recognition whether the request for assistance/rescue has been input.

In addition, a controller to transmit a trigger signal to an emergency call unit may be included in an airbag control unit or included in a head unit, or a logic that determines whether to deploy the airbags may be changed such that the same CPU or MCU is used, thereby improving a convenience in design, decreasing cost manufacturing, or miniaturizing chips.

Provided herein is a vehicle capable of promptly requesting assistance and/or a rescue when an emergency has occurred in the vehicle by transmitting a trigger signal to an emergency call unit even when only a few of a plurality of airbag deployment conditions are satisfied and a control method for the same.

In addition, reliability of an emergency call may be improved by determining one more time via voice recognition whether an emergency has actually occurred when a few of the plurality of airbag deployment conditions are satisfied.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A vehicle comprising:
a detection unit configured to detect a collision of the vehicle;
an emergency call module configured to transmit an emergency call when a trigger signal is input;
an airbag module comprising at least one airbag and configured to supply gas to the at least one airbag when the trigger signal is input;
an airbag controller configured to determine an airbag deployment condition based on an output of the detection unit and transmit the trigger signal to the airbag module when the airbag deployment condition is satisfied; and
an emergency call controller configured to determine the airbag deployment condition based on the output of the detection unit and transmit the trigger signal to the emergency call unit when the airbag deployment condition is satisfied, wherein the airbag deployment condition is determined by applying a different standard from the airbag controller, wherein:
the airbag controller determines that the airbag deployment condition is satisfied when a result calculated based on the output of the detection unit is equal to or greater than a first reference value; and
the emergency call controller determines that the airbag deployment condition is satisfied when the result calculated based on the output of the detection unit is equal to or greater than a second reference value, which is lower than the first reference value.

2. The vehicle according to claim 1, further comprising:
a voice recognition module configured to recognize a user's voice,
wherein the airbag controller activates the voice recognition module when the airbag deployment condition is satisfied.

3. A vehicle comprising:
a detection unit configured to detect a collision of the vehicle;
an emergency call module configured to transmit an emergency call when a trigger signal is input an airbag module comprising at least one airbag and configured to supply gas to the at least one airbag when the trigger signal is input an airbag controller configured to determine an airbag deployment condition based on an output of the detection unit and transmit the trigger signal to the airbag module when the airbag deployment condition is satisfied; and an emergency call controller configured to determine the airbag deployment condition based on the output of the detection unit and transmit the trigger signal to the emergency call unit when the airbag deployment condition is satisfied, wherein the airbag deployment condition is determined by applying a different standard from the airbag controller, wherein:

the airbag controller determines that the airbag deployment condition is satisfied when the result calculated based on the output of the detection unit is equal to or less than the first reference value; and the emergency call controller determines that the airbag deployment condition is satisfied when the result calculated based on the output of the detection unit is equal to or less than the second reference value, which is higher than the first reference value.

4. The vehicle according to claim 3, further comprising:
a voice recognition module configured to recognize a user's voice,
wherein the airbag controller activates the voice recognition module when the airbag deployment condition is satisfied.

5. A control method for a vehicle, the method comprising the steps of:
determining whether an airbag deployment condition is satisfied by applying a first reference value and transmitting a trigger signal to an airbag module when the airbag deployment condition is satisfied; and
determining whether the airbag deployment condition is satisfied by applying a second reference value which is different from the first reference value and transmitting the trigger signal to the emergency call unit when the airbag deployment condition is satisfied, wherein:
the step of determining whether the airbag deployment condition is satisfied by applying the first reference value comprises determining that the airbag deployment condition is satisfied when a result calculated based on an output of at least one sensor to detect a collision of the vehicle is equal to or greater than the first reference value, and
the step of determining whether the airbag deployment condition is satisfied by applying the second reference value comprises determining that the airbag deployment condition is satisfied when the result calculated based on the output of the at least one sensor is equal to or greater than the second reference value, which is lower than the first reference value.

6. The method according to claim 5, further comprising:
recognizing a user's voice using a voice recognition module; and
activating the voice recognition module when the airbag deployment condition is satisfied.

7. A control method for a vehicle, the method comprising the steps of:
determining whether an airbag deployment condition is satisfied by applying a first reference value and transmitting a trigger signal to an airbag module when the airbag deployment condition is satisfied; and
determining whether the airbag deployment condition is satisfied by applying a second reference value which is different from the first reference value and transmitting the trigger signal to the emergency call unit when the airbag deployment condition is satisfied, wherein:
the step of determining whether the airbag deployment condition is satisfied by applying the first reference value comprises determining that the airbag deployment condition is satisfied when the result calculated based on the output of the at least one sensor to detect a collision of the vehicle is equal to or less than the first reference value, and
the step of determining whether the airbag deployment condition is satisfied by applying the second reference value comprises determining that the airbag deployment condition is satisfied when the result calculated based on the output of the at least one sensor is equal to or less than the second reference value, which is higher than the first reference value.

8. The method according to claim 7, further comprising:
recognizing a user's voice using a voice recognition module; and
activating the voice recognition module when the airbag deployment condition is satisfied.

* * * * *